Patented July 21, 1936

2,048,593

UNITED STATES PATENT OFFICE 2,048,593

PRODUCTION OF PIGMENTS

Harold Simmons Booth, Cleveland Heights, Ohio

No Drawing. Application June 27, 1932,
Serial No. 619,526

10 Claims. (Cl. 134—58)

This invention relates to the production of pigments and particularly to composite or compound pigments.

The principal object of the invention is the production of such pigments by bringing together the component parts thereof in a fused water soluble inert anhydrous melt in which at least one of the component parts is soluble and in which the other is present in a state of fine subdivision whereby to effect the union of such component parts. The component parts may both or all be soluble in the melt, or one or some of them may be soluble while the remaining one or more is merely finely divided and suspended in the melt. After the component parts are brought together, the melt may then be dissolved in water, leaving a water insoluble composite or compound pigment in a fine state of subdivision.

Other and more limited objects will become apparent as the description proceeds.

As an example, I will first describe my method as applied to some paint pigments which are, apparently, new chemical compounds and which are insoluble in water.

*A mixed pigment containing compounds of two or more bases and/or two or more acids, making water-insoluble compounds with each*

Examples of such pigments are (a) barium sulphate and calcium carbonate; (b) barium sulphate and calcium sulphate; (c) strontium sulphate and calcium carbonate; (d) strontium sulphate and calcium sulphate; (e) barium sulphate and strontium carbonate; (f) barium sulphate and strontium sulphate; (g) barium carbonate and calcium sulphate; (h) barium carbonate and calcium carbonate; (k) barium and calcium sulphates and calcium carbonate.

If these different ingredients be dissolved simultaneously in a molten salt such as one of the alkali halides in which they are all soluble and towards which they are all inert, and the melt be quenched with water to chill the melt and dissolve the solvent the result is a compound pigment and some of these pigments seem to exhibit superior qualities over the simpler compounds. Not only is the pigment much finer than anything secured by precipitation from aqueous solution but it has a different hiding power and higher suspendibility in vehicles such as linseed oil. Also it is my belief (though the value of the invention is not probably dependent upon the truth of my belief) that some at least of the material exists in the form of true double salts, whether of one acid radical linked to two bases or the radicals of two different acids being linked to one base. I observe a decrease in the specific gravity of the barytes which can readily be explained in this manner, combined with a resistance to weathering and climate which would also be predictable of such compositions. Of course, decolorization of any iron impurities can be performed upon the pigment or their raw materials either before or after mixing as and when desirable.

*Production of compound pigments*

Above I have described the production of compound pigments wherein both (or all) the components of the pigment were soluble in the molten bath. It is also possible by my process to produce compound pigments wherein one or more of the compounds may be insoluble in the bath. Some of the simplest examples of this are:

(1) *Ordinary lithopone.*—Dissolve barytes in the molten salt, filter and/or decant from the insoluble impurities, purify or decolorize and add to the melt the necessary amount of zinc sulphide finely divided. Before this is done the barytes should be clarified or decolorized in any suitable manner. The zinc sulphide dissolves only slightly if at all, but should be thoroughly stirred into the molten mass which is then quenched in water. This single operation produces complete lithopone as a white insoluble precipitate of superior fineness and pigment value. If a little calcium fluoride be added to the melt the product is still further improved; or the melt may be quenched in a solution containing a protective colloid, such as soap, latex, etc.

(2) *Titanium pigments.*—Composite pigments are made in which titanium dioxide is employed in place of zinc sulphide. It may be made according to my process by stirring titanium dioxide into a purified fusion of barium sulphate in the molten salt and quenching the molten mass in water which produces a double precipitate of barium sulphate and titanic oxide. The addition of calcium fluoride to the melt produces a precipitate of increased fineness; or the melt may be quenched in a solution containing a protective colloid, such as soap, latex, etc.

(3) *Chromium pigments.*—The sulphate of barium, strontium or calcium is prepared and decolorized; then to the fusion is added a chromium compound e. g. chromium carbonate, chromium hydroxide, chromium sulphate or a chromate, dichromate or chromic acid, etc. The chromium sulphate and the chromic anhydride immediately break down into $Cr_2O_3$ which remains suspended in the fused mass; if a chromate or dichromate has been used it can be decomposed by the addition of a suitable reducing agent (e. g. sulphur, sodium sulphide, barium sulphide, carbon, etc.). If the resulting melt be now quenched in water the simultaneous precipitation of the chromic oxide on the insoluble sulphate yields an inert green pigment, the color depending upon the amount of chromium present.

(4) *Chrome-lithopone.*—Add a barium, strontium, or calcium sulphide to a solution of a chromate or dichromate in the fused salt. This forms simultaneously the sulphate of the alkali-earth metal and reduces the chromate to oxide. Quench and precipitate as before. The depth of the color depends upon the proportion of chromate to alkaline earth compound.

(5) Lithopone has heretofore been mentioned. The process just described can be extended to the production of titanium or zirconium composite pigments directly from the ores. The barytes and the rutile (or zirconia) are dissolved in sodium neutral sulphate combined with enough acid sulphate to bring the rutile (or zirconia) into solution. Sodium chloride can be used as the melt if the amount of acid sulphate and the temperature employed be so restrained as not to evolve hydrochloric acid; it is best in any case to treat the alkali acid sulphate as a reagent and employ only the amount necessary for the reaction. Iron colorization is eliminated in a suitable manner. This can be done separately for the barytes and for the rutile or it can be done once for all. The proportions of barytes and rutile employed are those desired in the pigment. Finally the melt is quenched as above described and the water soluble portion of the melt removed, leaving a mixed precipitate of barium sulphate and titanium (or zirconium) oxide. Sulphates of strontium and/or calcium may be used either in addition to or in substitution for the barytes. The addition of calcium fluoride to the melt enhances the fineness of the precipitate and also constitutes a valuable addition to the pigment; or the melt may be quenched in a solution containing a protective colloid such as soap, latex, etc.

If the melt is quenched in a solution of sodium carbonate instead of in water the sulphuric acid liberated by the hydrolizing of the titanium (or zirconium) sulphate is taken up and recovered when the solution is evaporated. If the melt be quenched in a solution of calcium chloride or in a suspension of lime or calcium carbonate the sulphuric acid produces an insoluble sulphate which adds to the precipitate.

For each of the foregoing described procedures the cheapest and most available solvent is ordinary sodium chloride, although the chlorides of potassium and lithium are also generally usable (and those of rubidium and caesium also as I believe except for their cost), while the chlorides of magnesium, calcium, barium, and/or strontium can be used in some cases. Also other salts than the chlorides can be employed such as the alkali bromides, carbonates, fluorides, hydroxides, iodides, phosphates, and sulphates. In general the reaction described can be produced in any anhydrous molten salt which does not decompose at the temperature in question or enter into the reaction, although for practical purposes the salt employed as a solvent usually ought to be soluble in water so as to enable the ready removal thereof and the separation of the solutes. This consideration, taken in conjunction with the necessity of employing a substance which melts at a reasonable temperature and neither decomposes nor enters into the reaction, restricts the choice to a comparatively narrow range, and I believe there are few outside those above named and their close analogues. The question of decomposition bars most of the organic compounds.

There are in several instances some decided advantages in the use of potassium chloride instead of sodium chloride, chiefly as regards the ease of solution and recovery. The difference in solubility of sodium chloride between hot and cold water is not so very great, but in the case of potassium chloride it is extremely great. Accordingly when potassium chloride is used as the melt, and the molten mass with whatever product is dissolved therein is decanted into water, a comparatively small amount of liquid is required, since the heat of the melt raises it to the boiling point. If now this saturated solution be rapidly removed from the insoluble product and allowed to cool, a large part of the potassium chloride will crystallize out without the employment of further heat to evaporate the same as would be necessary with sodium chloride, and this economy of fuel is in some cases more than enough to offset the difference in cost of the two substances.

I do not wish to be understood as asserting that all the above named fusible anhydrous compounds can be used with equal facility or satisfaction. Some like the sulphates and the hydroxides tend to enter into the reaction, which is sometimes permissible, and at other times undesirable; some like the iodides tend to decompose too readily; some have too high a melting point; and some will not dissolve particular raw materials, although the alkali chlorides will operate with all substances herein mentioned and undoubtedly with many others, wherefore I hold myself entitled to all uses of my invention without need for further description.

When I state that the molten bath which is the one essential characteristic of all the procedures herein described must consist of a substance which does not enter into chemical reaction with any of the solutes, products, or reagents, I mean merely that no such chemical combinations must occur as will evolve heat or produce persistent new compounds, and I do not intend to bring in question any theories of solution, dissociation, etc.

I do not limit myself to the specific method indicated in the description for contacting the reacting substances. It is in some cases advantageous to mix intimately all or part of the reactants and the solvent salts or substances and melt them together while they are being continuously added. I wish my claims to be construed without limitation on the method or order of contacting the reacting substances and solvent salts or substances.

This application contains subject matter in common with my applications Serial No. 619,527, filed June 27, 1932 and Serial No. 623,547, filed July 19, 1932.

Having thus described my invention what I claim is:

1. The process of producing composite pigments which comprises bringing together from separate sources in a state of fine subdivision a plurality of water insoluble pigment forming materials in a fused, water soluble, inert, anhydrous melt, one of said pigment forming materials being soluble in said melt, and then separating said melt from the resulting mixture by dissolving the melt in water.

2. The process of producing composite pigments which comprises bringing together from separate sources in a state of fine subdivision a plurality of pigment forming materials in a fused, inert, anhydrous melt, at least one of said pigment forming materials being soluble in said melt and at least one thereof being of the formula: R.Ac, where R indicates a water insoluble oxide of a metallic element, Ac indicates an acid anhydride and the period (.) indicates a valency bond weaker than the bond between the atoms making up the component R, and then separating said melt from the resulting composite pigment by dissolving the melt in water.

3. The process of producing composite pigments which comprises bringing together from separate sources in a state of fine subdivision a plurality of water insoluble pigment forming materials in a fused water soluble, inert, anhydrous melt, one of said pigment forming materials being soluble in said melt, and then separating said melt from the resulting composite pigment by dissolving the melt in water, said pigment forming materials being barium sulphate and titanium oxide.

4. The process of producing composite pigments which comprises bringing together from separate sources in a state of fine subdivision a plurality of water insoluble pigment forming materials in a fused water soluble, inert, anhydrous melt, one of said pigment forming materials being soluble in said melt, and then separating said melt from the resulting composite pigment by dissolving the melt in a water bath containing therein a protective colloid, said pigment forming materials being barium sulphate and titanium oxide.

5. The process of producing composite pigments which comprises bringing together from separate sources in a state of fine subdivision a plurality of water insoluble pigment forming materials in a fused water soluble, inert, anhydrous melt, one of said pigment forming materials being soluble in said melt, and then separating said melt from the resulting composite pigment by dissolving the melt in water, said pigment forming materials being an alkaline earth sulphate and an alkaline earth carbonate.

6. The process of producing composite pigments which comprises bringing together from separate sources in a state of fine subdivision a plurality of water insoluble pigment forming materials in a fused water soluble, inert, anhydrous melt, one of said pigment forming materials being soluble in said melt, and then separating said melt from the resulting composite pigment by dissolving the melt in a water bath containing therein a protective colloid, said pigment forming materials being an alkaline earth sulphate and an alkaline earth carbonate.

7. The process of producing composite pigments which comprises bringing together from separate sources in a state of fine subdivision a plurality of water insoluble pigment forming materials in a fused water soluble, inert, anhydrous melt, one of said pigment forming materials being soluble in said melt, and then separating said melt from the resulting composite pigment by dissolving the melt in water, said pigment forming materials being an alkaline earth sulphate and a water insoluble metal oxide.

8. The process of producing composite pigments which comprises bringing together from separate sources in a state of fine subdivision a plurality of water insoluble pigment forming materials in a fused water soluble, inert, anhydrous melt, one of said pigment forming materials being soluble in said melt, and then separating said melt from the resulting composite pigment by dissolving the melt in a water bath containing therein a protective colloid, said pigment forming materials being an alkaline earth sulphate and a water insoluble metal oxide.

9. The process of producing composite pigments which comprises bringing together from separate sources in a state of fine subdivision a plurality of water insoluble pigment forming materials in a fused water soluble, inert, anhydrous melt, one of said pigment forming materials being soluble in said melt, and then separating said melt from the resulting composite pigment by dissolving the melt in water, said pigment forming materials being barium sulphate and zinc sulfide.

10. The process of producing composite pigments which comprises bringing together from separate sources in a state of fine subdivision a plurality of water insoluble pigment forming materials in a fused water soluble, inert, anhydrous melt, one of said pigment forming materials being soluble in said melt, and then separating said melt from the resulting composite pigment by dissolving the melt in a water bath containing therein a protective colloid, said pigment forming materials being barium sulphate and zinc sulfide.

HAROLD SIMMONS BOOTH.